Patented Apr. 8, 1947

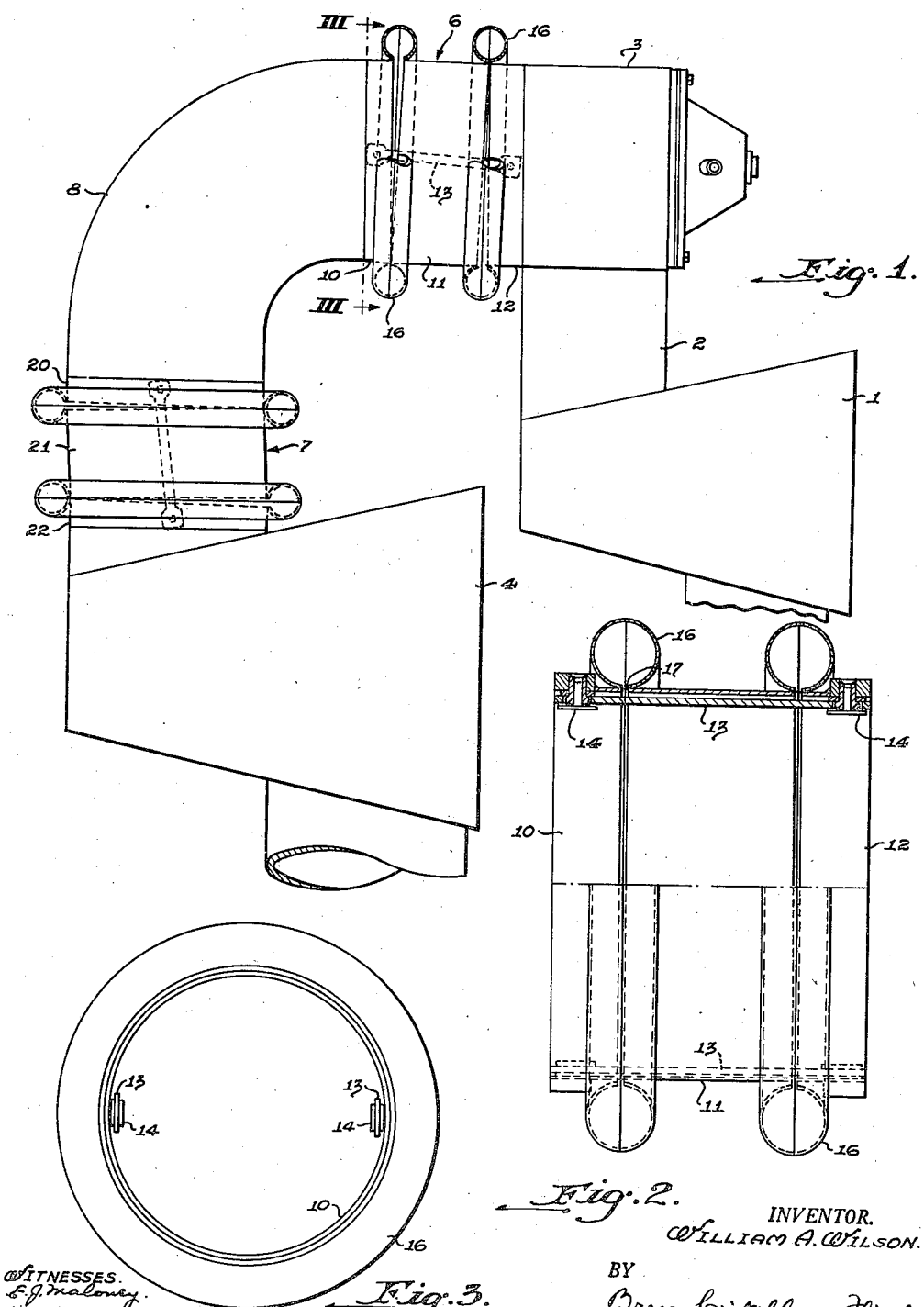

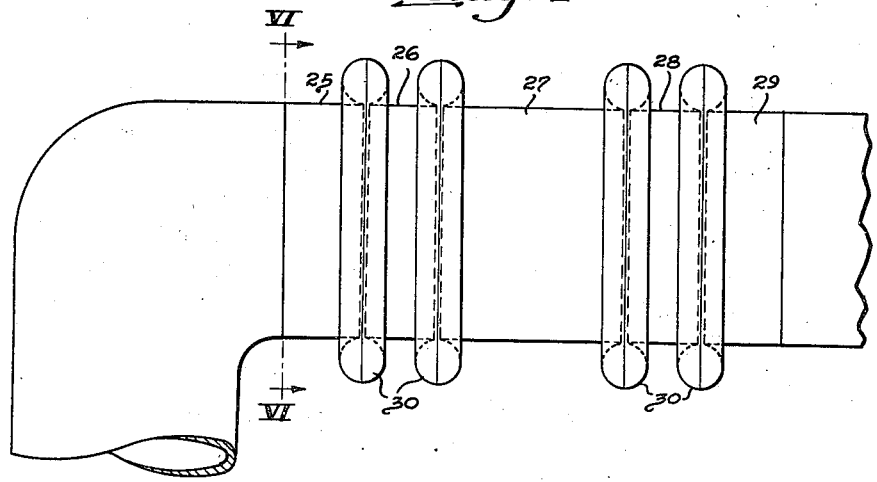
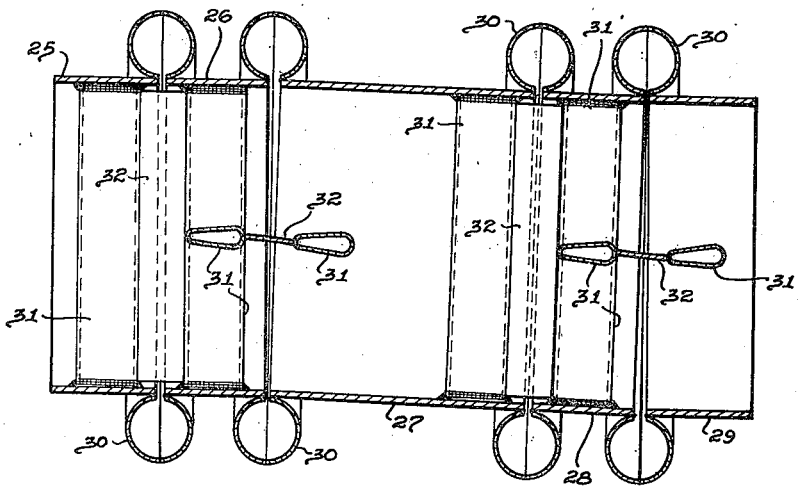
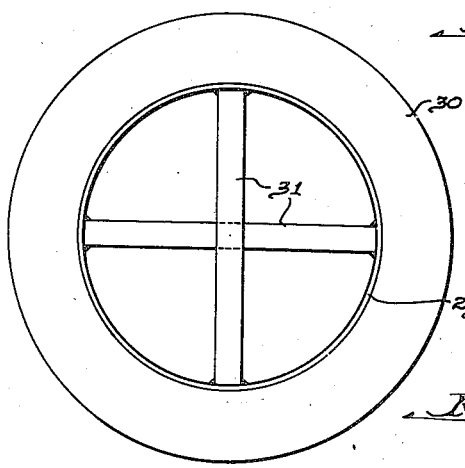
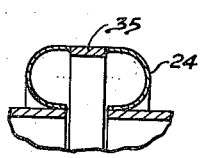
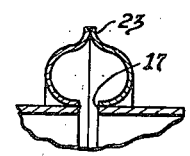

2,418,800

UNITED STATES PATENT OFFICE 2,418,800

FLEXIBLE JOINT FOR CONDUITS

William A. Wilson, Greensburg, Pa., assignor to Elliott Company, Jeannette, Pa., a corporation of Pennsylvania Application November 21, 1944, Serial No. 564,432

5 Claims. (Cl. 285—90)

This invention relates to flexible joints for conduits that conduct fluid under high pressure.

In gas turbine plants, for example, some of the ducts that connect the different elements include elbows, so different sections of the same duct may be disposed more or less at right angles to each other. When the plant is placed in operation the hot gases passing through the system cause the ducts to expand. Longitudinal expansion of a given straight section of an elbowed duct will tend to move or bend laterally the other straight section extending at an angle away from the first section. Therefore, it is customary to provide such ducts with pairs of flexible joints that will allow them to adjust themselves to the changing conditions induced by expansion and contraction of the ducts. However, the joints known heretofore, when made with walls thick enough to give the strength necessary for withstanding the high fluid pressure within the ducts, have not been very flexible. The joint walls have had to be relatively thick because the fluid pressure inside the joints puts them under bending stresses. Because of their resistance to flexing the distance between joints has had to be considerable in order to provide for the necessary amount of angular displacement of the duct, thereby preventing it from being made short enough for a compact turbine plant. Where the duct is straight there is the problem of providing a satisfactory joint that will allow longitudinal expansion of the duct without putting undue stress on the apparatus to which the duct is connected at its opposite ends.

It is among the objects of this invention to provide a conduit joint which is very flexible and yet capable of withstanding high internal fluid pressures, which prevents the conduit at the joint from spreading apart, and which is relatively simple and inexpensive.

In accordance with this invention a pair of high pressure fluid conduits are disposed end to end, usually in axial alignment, with a small space between their adjacent ends. This space is sealed by means of a toroidal connecting member encircling the adjacent ends of the conduits and secured thereto, preferably, but not necessarily, by annular welds. The wall of this member between the conduits is split circumferentially to permit angular movement of the conduits relative to each other. The toroidal member preferably is substantially circular in cross section so that its wall is subject substantially only to tension stresses from high pressure fluid inside the conduits. However, the toroidal member may be made from two axially spaced elements each semi-circular in cross section with their outer edges joined by a rigid ring. Consequently, the flexible wall of the toroidal member can safely be made much thinner than if it also were subject to large bending stresses, and its flexibility therefore is increased. Thus, when the allowable pressure stresses in the wall of the toroid are at least as great as those in the walls of the conduits, the thickness of the flexible wall of the toroid need be no greater than the thickness of the conduit walls multiplied by the figure obtained when the difference between the inner and outer radii of the toroid is divided by the diameter of the conduits. In a toroid that is circular in cross section, the difference between its inner and outer radii is the diameter of the cross section of the member. Due to the high flexibility of the toroid, there need be only a short intermediate conduit when a pair of such joints are provided for operation together.

Such a toroidal member makes an excellent expansion joint for straight conduits that are anchored at their opposite ends, but when they are connected to an elbow it is desirable to restrain or prevent movement of the conduits away from each other along their common axis when they are in alignment, which otherwise may occur when the elbow is free to move, due to fluid pressure within the conduits. This restraint is imposed by flexible tying means connected to the conduits. Thus, tie bars may extend lengthwise of the inner surfaces of the conduits across one or more joints with the opposite ends of the bars connected for limited universal movement to the walls of the conduits. Or, the flexible means may include a hinge or transversely flexible web extending diametrically across the conduits with its opposite ends straddling the space between the conduit ends. This web is rigidly connected to both conduits, but can bend transversely to permit one of them to be moved angularly relative to the other. Preferably, the edges of the web are secured to a pair of parallel struts extending across the conduits with their ends secured thereto. To permit bending in directions at right angles to each other, two joints of the same character may be provided, but with the struts and flexible web at one joint extending at right angles to the struts and web of the other joint.

The invention is illustrated in the accompanying drawings in which Fig. 1 is a side view of part of a gas turbine plant provided with several of my flexible joints two of which are shown partly broken away; Fig. 2 is an enlarged view of two joints, half in horizontal section and half in elevation; Fig. 3 is a view taken on the line III—III of Fig. 1; Fig. 4 is a view, similar to Fig. 1, of a modification; Fig. 5 is an enlarged longitudinal section through the joints of Fig. 4 showing two of them flexed; Fig. 6 is a view taken on the line VI—VI of Fig. 4; and Figs. 7 and 8 are enlarged cross sections of two modifications of toroidal joint members.

Referring to Fig. 1 of the drawings, an air compressor 1 is connected by a duct 2 to the side of a combustion chamber 3 in which the compressed air is mixed with fuel and the mixture burned to produce combustion gases having a high temperature. The outlet of the combustion chamber is connected to a gas turbine 4 by means of horizontal and vertical ducts 6 and 7 joined by an elbow 8. When the ducts and elbow become heated by the hot gases flowing through them, they expand lengthwise to push the elbow away from both the combustion chamber and the turbine, which are suitably anchored on foundations, whereby the ducts tend to become bent. To provide for such expansion so that undue lateral strain will not be imposed on the ducts, and the combustion chamber and turbine will not be subjected to heavy force axially of the adjoining ducts, the ducts are provided with flexible joints that permit them to bend freely.

In accordance with this invention the horizontal duct 6 is formed from three separate short conduits 10, 11 and 12 which may be disposed in axial alignment with one another when cold, as shown in Fig. 2, or end conduit 10 may be offset relative to end conduit 12 in a direction opposite to that in which it will be moved when duct 7 expands. The end conduits 10 and 12 are rigidly connected to the elbow and combustion chamber, respectively. The intermediate conduit 11 is shorter than the distance between the end conduits so as to provide short spaces between them and its opposite ends. To prevent the fluid pressure in duct 6 from separating it at the joints, the two end conduits are prevented from moving away from each other along their common axis by a pair of rigid tie bars 13 extending through the intermediate conduit. The opposite ends of each tie bar are provided with openings through which extend studs 14 that are anchored in the walls of the end conduits, as shown in Figs. 2 and 3. The shank of each stud is convex lengthwise to provide a transversely curved annular surface on which the adjoining bar can rock or turn in any direction. This permits the end conduits to be displaced laterally relative to each other in any direction, or angularly in one plane.

To connect the three conduits 10, 11 and 12 together in order to seal the space between their ends, a pair of toroidal members 16 are used. Each member encircles the adjacent ends of a pair of adjacent conduits to which it is secured, preferably by annular welds 17 located right at the ends of the conduits. The wall of the toroid is split circumferentially between the conduits so that it has two spaced edges substantially flush with the ends of the conduits. The toroid preferably is formed from two halves that are arcuate in cross section and have their outer edges welded together after their inner edges have been welded to the conduits. The walls of the toroids are thin enough to allow them to be flexed in order to permit the center conduit 11 to adjust itself by moving angularly relative to the adjacent end conduits, as shown in Fig. 1, when the vertical duct 7 expands and contracts. That is, the axes of the two end conduits will be displaced laterally relative to each other but generally will remain substantially parallel, while the axis of the intermediate conduit will be inclined to them.

The vertical duct 7 likewise is formed from three short conduits 20, 21 and 22 between which there are flexible joints, the same as the ones just described, to take care of expansion and contraction of horizontal duct 6. In Fig. 1 both pairs of joints are shown flexed because it is assumed that the turbine is operating and therefore the ducts are hot and expanded.

An important feature of this invention is that the flexible annular elements, from which each toroidal member disclosed herein is formed, are substantially semi-circular in cross section. Although the outer edges of these elements preferably are welded face to face as indicated in Figs. 2 and 5, the outer edge portions may be curved outwardly to form flanges 23 the inner surfaces of which are held in engagement with each other by welding around their outer edges, as shown in Fig. 8. Or, as shown in Fig. 7, the flexible semi-circular elements 24 may be spaced axially from each other with their outer edges connected by a rigid ring 35 welded thereto. In such a case the space between the ends of the conduits will be greater than otherwise. Heretofore, similar connecting members for conduit joints have had flexible wall portions that normally were straight or only slightly curved in cross section so that when they were subjected to high fluid pressures they were bent as well as placed under tension as the connecting member attempted to assume circular form in cross section. The resulting combination of stresses required that such connecting members have relatively thick walls in order successfully to withstand the high fluid pressures imposed upon them. On the other hand, with a toroid shaped in cross section as disclosed herein, the metal of the wall is placed substantially only in tension by internal fluid pressure. The fluid pressure can not bend the toroid materially. It will therefore withstand higher fluid pressures than other types of joints of this general character having the same wall thickness. The result is that for a given fluid pressure the flexible wall of the connecting member at the joint can be made thinner than heretofore, wherefore it will have materially greater flexibility. This is because in a joint of given geometry, the mechanical forces required to produce a given amount of deformation of the joint wall are in direct proportion to the cube of the thickness of that wall. In prior joints, bending stress due to joint motion is directly proportional to wall thickness for a given deflection. When the flexible connecting member is a toroid formed as disclosed herein, preferably circular in cross section, the pressure stresses in its wall due to fluid pressure are inversely proportional to the first power of the wall thickness, whereas in prior joints the bending stresses, due to fluid pressure, are inversely proportional to the square of the joint's wall thickness. Hence, a decrease in wall thickness of my toroid does not increase the pressure stresses in the wall nearly so much as in other joints. The greater flexibility attainable with my joint, as compared to others designed for the same pressure, allows greater motion in a short space and thus permits shorter ducts to be used. It also results in less force being imposed on the machines to which the expanding ducts are connected, when they extend in a straight line.

The thinness of the wall of my toroidal connecting member in relation to its cross sectional diameter will now be referred to in greater detail. In the case where the allowable pressure stresses in the wall of the toroid are at least as great as the pressure stresses in the wall of the conduits that it connects, the thickness of the toroid's wall need be no greater than the product obtained when the thickness of the conduit walls is multiplied by the figure resulting from dividing the diameter of the toroid cross section by the conduit diameter. This can be represented by the formula $$\frac{t}{T} = \frac{d}{D} \times \frac{S}{s}$$

wherein $t$ is the thickness of the toroid wall, $d$ is the diameter of a cross section of the toroid, $s$ is the pressure stresses in the wall of the toroid, and the large letters represent the same factors for the conduits connected by the toroid. This can be stated in another way if the pressure stresses in the conduit and toroid walls are equal: The ratio of wall thickness of the toroid to its cross section diameter is the same as the ratio of wall thickness of the conduit to its diameter. Thus, if the conduits are 15 inches in diameter with walls .25 inch thick, and the toroidal connecting member has a diameter in cross section of 3 inches, the wall of the toroid need be only .05 inch thick. The walls of the toroids shown in the drawings herein are exaggerated in thickness, because otherwise they would appear only as lines in the sectional views. In the case of Fig. 7, the conduit diameter is divided into the difference between the outer and inner radii of the toroid as a whole. This difference corresponds to the cross section diameter of the toroids that are circular in cross section.

In the modification shown in Fig. 4 there are four joints arranged in pairs. This is because the internal flexible means, about to be described, which tie the adjacent conduits together and prevent them from moving relative to each other along their common axis, are of different form than those shown in Fig. 1. To provide the four joints, there are five conduits 25, 26, 27, 28 and 29 each spaced a short distance from the one next to it, and each of these spaces is encircled by a flexible toroidal member 30 that is substantially circular in cross section, or like Fig. 7, and is welded to the ends of the encircled conduits. Inside the conduits, as shown in Fig. 5, a pair of spaced parallel struts 31 extend diametrically across the adjacent conduits at each joint with their ends rigidly secured to the conduit walls. Connecting each pair of struts is a transversely flexible web 32, preferably metal, which extends lengthwise of the struts with its ends straddling the annular space between the conduit ends. The side edges of this web are rigidly secured to the struts, such as by welding. This web prevents the adjoining conduits from moving toward and away from each other when they are in axial alignment, but it permits them to move angularly relative to each other in a plane transverse to the web because it can bend transversely. Angular movement of some of the conduits in a plane perpendicular to that just mentioned is permitted by mounting the adjacent flexible web at right angles to the first web. The struts that support this second web are likewise mounted at right angles to the first pair of struts (Fig. 6).

The struts between the two webs may intersect each other at the center of the conduits. With this arrangement one of the joints can bend in one direction while the adjacent joint can bend at right angles to the first. By having two pairs of these joints, as shown in Fig. 5, the same angular displacement can be produced as that obtained in Fig. 1. The struts preferably are streamlined so as to interfere as little as possible with the gas flow through the conduits.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. The combination with a pair of high pressure fluid conduits disposed end to end with a small space between them, of a transversely flexible web extending diametrically across the conduits with its opposite ends straddling said space, means connecting the web to both conduits, and a toroidal connecting member encircling the adjacent ends of the conduits and secured thereto to seal said space, the wall of said member between said conduits being split circumferentially and said member being flexible to permit angular movement of the conduits relative to each other, and said member being substantially circular in cross section whereby its wall is subject substantially only to tension stresses from high pressure fluid inside said conduits.

2. The combination with a pair of high pressure fluid conduits disposed end to end with a small space between them, of a pair of parallel struts extending diametrically across the conduits on both sides of said space, the opposite ends of each strut being secured to the surrounding conduit, a transversely flexible web extending across the conduits with its opposite edges secured to said struts, and a toroidal connecting member encircling the adjacent ends of the conduits and secured thereto to seal said space, the wall of said member between said conduits being split circumferentially and said member being flexible to permit angular movement of the conduits relative to each other, and said member being substantially circular in cross section whereby its wall is subject substantially only to tension stresses from high pressure fluid inside said conduits.

3. The combination with a pair of high pressure fluid conduits disposed end to end with a small space between them, of a pair of parallel struts extending diametrically across the conduits on both sides of said space, the opposite ends of each strut being rigidly secured to the surrounding conduit, hinging means between said struts and secured thereto, and a torodial connecting member encircling the adjacent ends of the conduits and secured thereto to seal said space, the wall of said member between said conduits being split circumferentially and said member being flexible to permit angular movement of the conduits relative to each other, and said member being substantially circular in cross section whereby its wall is subject substantially only to tension stresses from high pressure fluid inside said conduits.

4. The combination with three high pressure fluid conduits disposed end to end with small spaces between their adjacent ends, of a pair of transversely flexible webs extending across the conduits at right angles to each other, the opposite ends of one web straddling one of said spaces, and the opposite ends of the other web straddling the other space, means connecting each web to the two conduits surrounding it, and a toroidal connecting member encircling each of said spaces and secured to the two adjacent conduits to seal the space between them, the wall of each member between said adjacent conduits being split circumferentially and said members being flexible to permit angular movement of the conduits relative to one another, and said members being substantially circular in cross section whereby their walls are subject substantially only to tension stresses from high pressure fluid inside said conduits.

5. The combination with three high pressure fluid conduits disposed end to end with small spaces between their adjacent ends, of a pair of parallel struts extending diametrically across the conduits on both sides of one of said spaces, another pair of parallel struts disposed at right angles to the first pair and extending diametrically across the conduits on both sides of the other of said spaces, the opposite ends of each strut being secured to the surrounding conduit, a transversely flexible web extending across the conduits between each pair of struts with its opposite edges secured to the adjacent struts, and a toroidal connecting member encircling each of said spaces and secured to the two adjacent conduits to seal the space between them, the wall of each member between said adjacent conduits being split circumferentially and said members being flexible to permit angular movement of the conduits relative to one another, and said members being substantially circular in cross section whereby their walls are subject substantially only to tension stresses from high pressure fluid inside said conduits.

WILLIAM A. WILSON.

REFERENCES CITED

The following references are of record in the file of this patent:

UNITED STATES PATENTS

| Number | Name | Date |
|---|---|---|
| 2,404,447 | Marancik | July 23, 1946 |

FOREIGN PATENTS

| Number | Country | Date |
|---|---|---|
| 210,032 | British | Jan. 21, 1924 |
| 191,911 | Swiss | July 15, 1937 |